(12) United States Patent
Schröder (10) Patent No.: US 10,183,737 B2
(45) Date of Patent: Jan. 22, 2019

(54) HIGH LIFT SYSTEM FOR AN AIRCRAFT

(71) Applicant: Airbus Operations GmbH, Hamburg (DE)

(72) Inventor: Karsten Schröder, Bremen (DE)

(73) Assignee: Airbus Operations GmbH (DE)

( * ) Notice: Subject to any disclaimer, the term of this patent is extended or adjusted under 35 U.S.C. 154(b) by 1440 days.

(21) Appl. No.: 13/650,749

(22) Filed: Oct. 12, 2012

(65) Prior Publication Data

US 2013/0075536 A1    Mar. 28, 2013

Related U.S. Application Data

(63) Continuation of application No. PCT/EP2011/055001, filed on Mar. 31, 2011.

(60) Provisional application No. 61/323,424, filed on Apr. 13, 2010.

(30) Foreign Application Priority Data

Apr. 13, 2010    (DE) .................. 10 2010 014 792

(51) Int. Cl.
    *B64C 9/24*    (2006.01)
    *B64C 9/34*    (2006.01)
    *B64C 9/14*    (2006.01)

(52) U.S. Cl.
    CPC .............. *B64C 9/24* (2013.01); *B64C 9/34* (2013.01); *B64C 2009/143* (2013.01); *Y02T 50/32* (2013.01)

(58) Field of Classification Search
    CPC .................................. B64C 9/24; B64C 9/34
    USPC ................... 244/198, 201, 213, 214
    See application file for complete search history.

(56) References Cited

U.S. PATENT DOCUMENTS

| | | | | |
|---|---|---|---|---|
| 3,064,927 A | * | 11/1962 | Chaplin, Jr. | 244/207 |
| 3,910,530 A | * | 10/1975 | James et al. | 244/214 |
| 3,917,193 A |   | 11/1975 | Runnels, Jr. | |
| 5,158,252 A | * | 10/1992 | Sakurai | 244/214 |

(Continued)

FOREIGN PATENT DOCUMENTS

| | | |
|---|---|---|
| CN | 101466597 A | 6/2009 |
| DE | 102006053259 A1 | 5/2008 |

(Continued)

OTHER PUBLICATIONS

"Aeronautics—Principles of Flight (Airfoils)", Allstar Network, Updated Dec. 23, 2008.*

*Primary Examiner* — Michael H Wang (74) *Attorney, Agent, or Firm* — Lerner, David, Littenberg, Krumholz & Mentlik, LLP (57) ABSTRACT

A high lift system for an aircraft includes at least one lift flap arranged on a wing forming a gap between a leading edge of the wing and a trailing edge of the lift flap in an extended position of the lift flap, and at least one flap adjustment mechanism for moving the lift flap between a retracted and at least one extended position relative to the wing. The wing includes a depression with a leading depression edge for accommodating the lift flap in a retracted position, and arranged in such an area of the wing that a correspondingly formed trailing edge region of the lift flap includes a curvature, by which the gap between the leading edge of the wing and trailing edge of the lift flap is convergent. A convergent and improved gap increases the efficiency of a high lift system without any active or movable means.

5 Claims, 5 Drawing Sheets

(56) References Cited

U.S. PATENT DOCUMENTS

| | | | | |
|---|---|---|---|---|
| 5,474,265 | A * | 12/1995 | Capbern et al. | 244/214 |
| 6,375,126 | B1 * | 4/2002 | Sakurai et al. | 244/214 |
| 7,270,305 | B2 * | 9/2007 | Rampton et al. | 244/214 |
| 7,578,484 | B2 * | 8/2009 | Fox et al. | 244/214 |
| 8,226,048 | B2 * | 7/2012 | Beyer et al. | 244/214 |
| 8,596,586 | B2 * | 12/2013 | Schroeder | 244/214 |
| 8,622,350 | B1 * | 1/2014 | Hoffenberg | 244/214 |
| 8,657,239 | B2 * | 2/2014 | Brown et al. | 244/214 |
| 2005/0116116 | A1 * | 6/2005 | Morgenstern | 244/214 |
| 2010/0219299 | A1 | 9/2010 | Holzhausen | |
| 2012/0292454 | A1 | 11/2012 | Schroeder | |

FOREIGN PATENT DOCUMENTS

| | | |
|---|---|---|
| DE | 102009057340 A1 | 6/2011 |
| EP | 1338506 A1 | 8/2003 |
| WO | 2008058695 A1 | 5/2008 |
| WO | 2011069887 A2 | 6/2011 |

\* cited by examiner

HIGH LIFT SYSTEM FOR AN AIRCRAFT

CROSS-REFERENCE TO RELATED APPLICATIONS

The present application is a continuation of International Application No. PCT/EP2011/055001, filed Mar. 31, 2011, which claims priority from U.S. Provisional Patent Application No. 61/323,424, filed on Apr. 13, 2010, and German Patent Application No. 10 2010 014 792.3, filed on Apr. 13, 2010, the disclosures of which are hereby incorporated herein by reference.

TECHNICAL FIELD

The invention relates to high lift system for an aircraft, comprising at least one lift flap arranged on a wing, and at least one flap adjustment mechanism for moving the lift flap between a retracted and at least one extended position relative to the wing.

BACKGROUND OF THE INVENTION

In modern commercial aircraft, the demand for as high a cruising speed as possible coupled with as low a takeoff and landing speed as possible is giving rise to the necessity of high lift systems, which can be activated during takeoffs and landings to markedly increase the lift coefficient. This is generally accomplished with lift-increasing flaps, which are deflected into the air stream of the aircraft. Among other things, especially widespread use is made of an abundance of different slats, e.g., extensible slats ("extensible slat") or leading edge flaps, such as Krüger flaps ("Kruger flap"), which are arranged so that they can move relative to the wing. For the sake of simplicity, the slats and flaps will be generally referred to as "lift flaps".

In one or several extended positions, lift flaps designed as slats can be spaced or offset away from the leading edge of the wing, thereby forming a gap relative to the leading edge of the wing. The gap allows an energy-rich stream of air to move from the flow approaching the wing onto the upper profile side of the wing, where it shifts the stall toward higher angles of attack. Depending on the design, lift flaps can be deflected with or without forming a gap in the flow approaching the aircraft, and increase both the surface of the wing and its curvature.

To ensure that the wing contour comprises a contour optimized for cruising flight with the lift flaps in a retracted position, the wing comprises depressions, recesses, indentations or the like for accommodating the lift flaps, wherein the shape of the lift flaps and depressions in the wing are adjusted to each other. As a consequence, the combination of wing and lift flaps gives rise to the outward cruising flight contour with the lift flaps retracted. Given a lift flap mounted so that it can pivot around an axis in the area of the leading edge of the wing, one section of a cruising flight contour for the bottom side of the wing yields the upper contour of the lift flap in the extended state.

Lift flaps are usually rigid, and comprise an internal structural design. How the surface of the lift flap directed relative to the wing in a stowed position is formed is essentially determined by this internal structural design, and hence prescribes the size of the corresponding depression for stowage in or on the wing. The lift flaps often comprise a tapering structural thickness, so that the depression in the wing is configured to correspond thereto.

DE 10 2006 053 259 A1 and WO 2008/058695 A1 introduce a high lift system for a wing of an aircraft in which lift flaps can be moved from a retracted position to extended positions in order to increase lift, wherein a gap between the high lift flaps and wing can be opened or closed independently of the position of the high lift flaps. This makes it possible to optionally achieve an improved maximum lift coefficient or improved drag ratio with less noise being generated.

BRIEF SUMMARY OF THE INVENTION

In order to increase aerodynamic efficiency, a gap to be formed relative to the wing is preferably essentially convergent, and comprises at most very small and aerodynamically negligible divergent sections. Because positioning is not significantly determined by aerodynamic requirements in known high lift systems with gap-forming lift flaps, but rather is governed by other non-aerodynamic boundary conditions, such as kinematic boundary conditions or a prescribed installation space distribution of components arranged in a front wing area, the lift flap may become rather unfavorably positioned or aligned from an aerodynamic standpoint when in an extended state. The progression of the gap aligned relative to a leading edge of the wing can then initially be convergent up to a minimum gap size, but comprise a divergent gap termination downstream, which again slows down a flow that had already been accelerated through the gap, preventing the gap from completely exerting its potential effect.

Therefore, an aspect of the invention provides a high lift system with at least one lift flap arranged on a wing and at least one flap adjustment mechanism for moving the lift flap between a retracted and at least one extended position relative to the wing, which offers an aerodynamic improvement and improves the effect produced by the lift flap of shifting the stall on the upper profile side of the wing toward higher angles of attack.

In an embodiment of the invention a high lift system is provided having a lift flap leading edge and lift flap trailing edge, which is shaped in such a way that it can be accommodated in a flush manner in a depression of the wing in a region near the leading edge, so as to provide an aligned enhancement to the wing there, wherein the depression comprises a leading depression edge and a trailing depression edge. The depression on the wing is arranged in such a way as to align the lift flap trailing edge relative to the leading depression edge in a stowed state. The leading depression edge is positioned in an area of the leading edge of the wing in such a way as to impart a type of curvature to the depression in the leading depression edge region that allows the correspondingly shaped lift flap moved into its extended positions to form a gap relative to the leading edge of the wing that continuously tapers downstream.

A lift flap as described herein, according to an embodiment of the invention, is stiff, and can be equipped in a conventional manner with a stiffening internal structure, wherein how the depression is positioned on the wing is essentially the determining factor with respect to the resultant curvature of the lift flap, and hence the progression of the gap between the lift flap and the wing. No additional structural features are required for the known adjustment mechanism or lift flap to optimize the gap geometry.

However, this integrated concept is not limited in its ramifications to just the configuration of a depression, for example on a bottom side of a wing, since varying the position of the depression in comparison to conventional high lift systems may occasionally require that additional installations be shifted within the region of the leading edge of the wing, as long as the usually unaffected installation space for such fixtures is not impacted by shifting the depression.

A secondary positive effect of a lift flap provided by the high lift system according to an embodiment of the invention lies in the fact that the camber of the lift flap exceeds that of known lift flaps due to the greater curvature at the trailing edge of the lift flap, thereby improving the circulation and aerodynamic efficiency compared to conventional high lift systems.

In general, random positions x along a chord of the profile of an airfoil with a profile chord length c is denoted by an x/c ratio. The leading edge of the wing is represented by a ratio of x/c=0%, while the trailing edge of the wing is represented by a ratio of x/c=100%.

In an embodiment of the invention, the leading depression edge is arranged at a position of the wing lying within a range of x/c=0.5% to x/c=2%. The curvature of the area of the wing near the leading edge is there usually pronounced in such a way that the depression, and hence the region around the correspondingly shaped trailing edge of the lift flap, comprises the form necessary for yielding a convergent gap.

In an embodiment of the invention, the depression on the wing is configured in such a way that the local tangent of the profile mean line on the correspondingly shaped trailing edge of the lift flap is inclined by an angle of 5-30° relative to the profile chord of the lift flap. In other words, the depression is located in a front region of the wing that already comprises so distinct a curvature that the lift flap is set up to produce a continuously convergent gap.

In an exemplary embodiment of the invention, the depression is shaped in such a way that the correspondingly configured lift flap comprises a curvature of 5-20° in an area near the trailing edges in a section measuring 5-25% of the profile length of the lift flap.

Another embodiment of the invention includes an aircraft with the aforementioned high lift system.

BRIEF DESCRIPTION OF THE DRAWINGS

Additional features, advantages and possible applications of the present invention may be gleaned from the following description of the exemplary embodiments and the figures. All described and/or graphically depicted features here constitute the subject matter of the invention whether taken separately or in any combination, even independently of their composition in the individual claims or back references thereto. Furthermore, the same reference numbers in the figures denote the same or similar objects.

DETAILED DESCRIPTION

Figure 1:
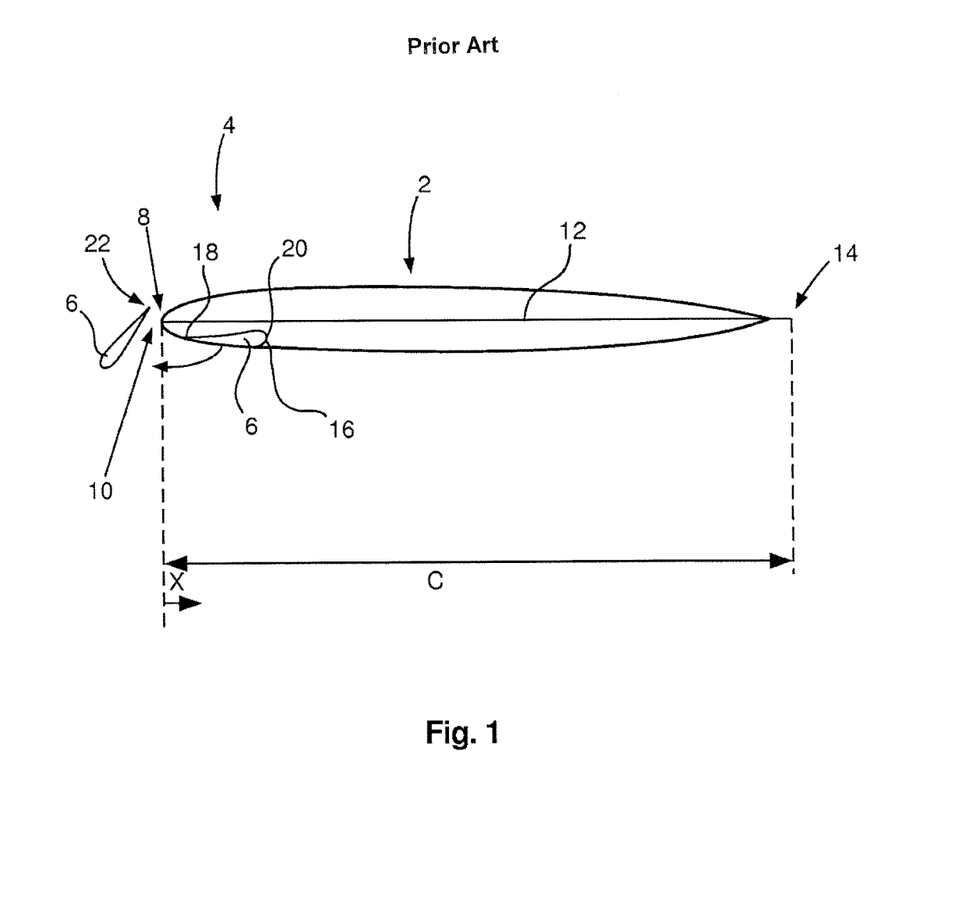
FIG. 1 shows a side view of a high lift system according to prior art, with a lift flap in an extended and in a retracted position.

FIG. 1 shows a wing 2 according to prior art equipped with a high lift system 4, for example one consisting of a lift flap 6, which can be spaced apart and positioned upstream from the wing 2 in relation to a leading edge 8 of the wing 2. This positioning creates a gap 10 between the lift flap 6 and leading edge 8, which ensures that an energy-rich stream of air is supplied to an upper side of the profile of the wing 2, so as to delay a stall there, and thus allow higher angles of attack and greater lift coefficients.

The profile length of the wing 2 is usually denoted with the parameter c. The distance of the leading edge 8 of the wing 2 along a profile chord 12 is usually denoted with the parameter x. Ratio x/c=100% at the trailing edge 14 of the wing 2, while a ratio x/c of 0% is present at the leading edge 8.

In a retracted position, the lift flap 6 is arranged in a depression 16 given a shape that corresponds to the lift flap 6. The depression 16 comprises a leading depression edge 18 and a trailing depression edge 20. According to prior art, the leading depression edge is arranged in an area comprising an x/c ratio of roughly greater than or equal to 2.5% (x/c≥2.5%). As a result, the curvature in the area of the trailing edge 22 of the correspondingly shaped lift flap 6 is so slight that the gap 10 between the lift flap 6 and leading edge 8 of the wing 2 is not exclusively convergent in prior art under unfavorable boundary conditions, but rather comprises a pronounced divergence in the area of the trailing edge 22 of the lift flap 6.

Figure 2A:
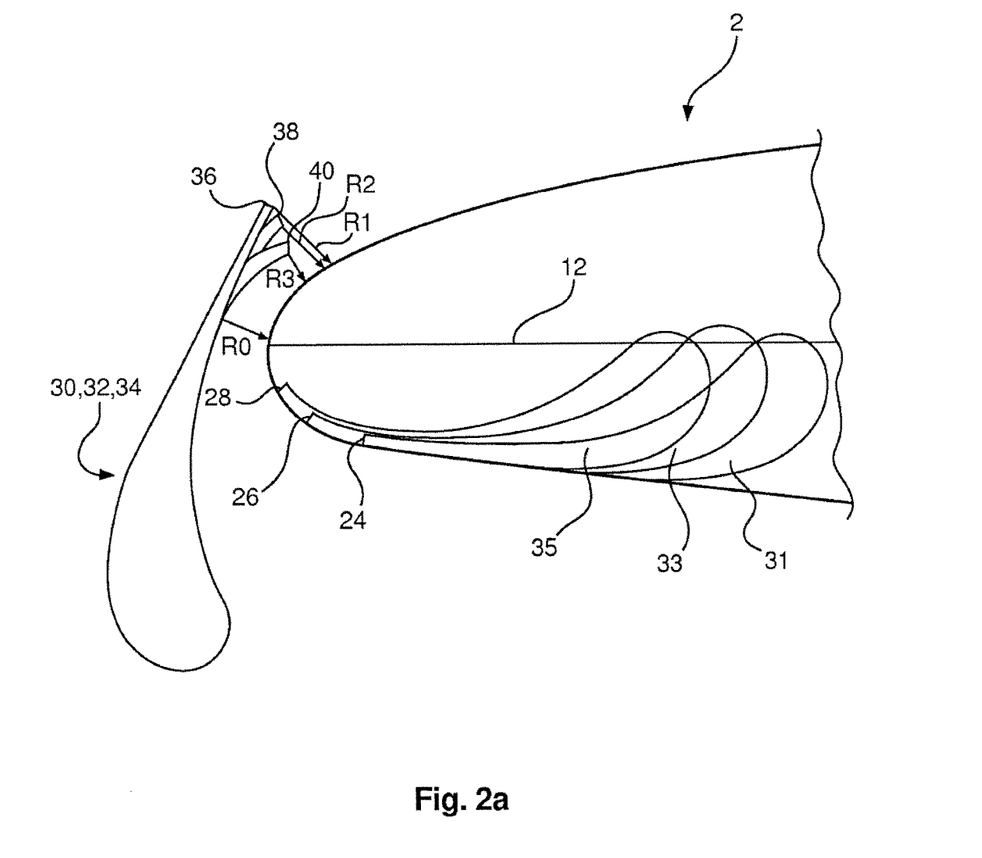
FIG. 2a shows an assembly drawing of a high lift system according to an embodiment of the invention with a lift flap in three different retracted positions, and the resultant gap geometries in the corresponding extended positions.

FIG. 2a illustrates how shifting a leading depression edge 24, 26 and 28 gives rise to depressions 31, 33 and 35, which result in lift flaps 30, 32 and 34 having a more distinct curvature in the area of their trailing edges 36, 38 and 40. The resultant gap geometries are increasingly improved as the leading depression edges 24, 26 and 28 shift more and more into the area of the leading edge 8, since this reduces or completely eliminates the gap divergence, as evident from the diminishing gap sizes R1, R2 and R3. For example, the gap size R1 may represent prior art, while R2 and R3 are achieved with the high lift system according to the invention. The depression 35 located closest to the leading edge 8 yields a correspondingly shaped lift flap 34, which in the extended state comprises the smallest possible gap size R3, which measures less than the minimum gap size R0 from prior art.

Figure 2B:
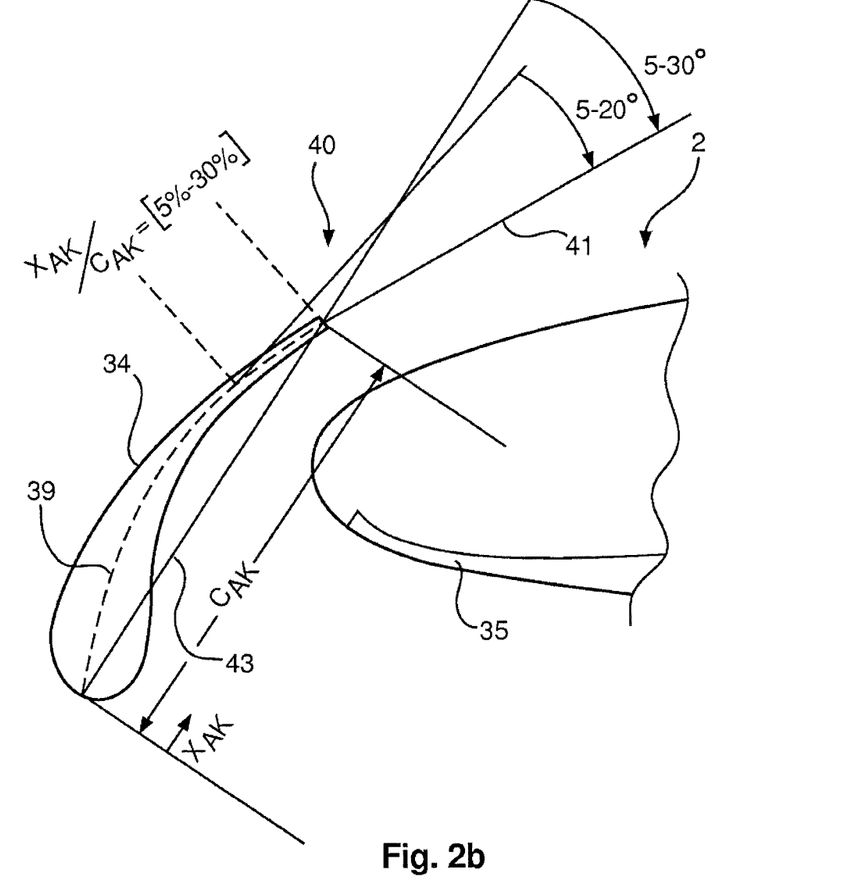
FIG. 2b shows possible correlations between local tangents of a profile mean line and a profile chord.

FIG. 2b provides an exemplary view of the lift flap 34 with a curved trailing edge 40 (not to scale). Similarly to the designations used for the wing 2, the profile of the lift flap comprises a profile depth cAK, wherein a parameter xAK can define a position along a profile chord. The relative positioning can be indicated by the quotients xAK/cAK.

Defined within the profile cross section of the lift flap 34 is a mean line 39, which lies precisely between the upper and lower side of the profile. In the region of the trailing edge 40 with xAK/cAK=100%, the mean line 39 comprises a tangent 41 that runs at an angle relative to a profile chord 43 of the lift flap 34. The angle included by the profile chord 43 and rearmost tangent 41 of the mean line 39 preferably lies within a range of 5-30°.

In order to form the continuously divergent gap 10, it may be especially expedient to bend to a particularly marked degree an area of the lift flap 34 near the trailing edge with xAK/cAK≥xAKk/cAK, wherein xAKk/c may lie within a range of 75% to 95%. It may be especially advantageous for xAKk/cAK to measure roughly 12.5%. This region near the trailing edge is preferably bent in such a way that the local tangent of the mean line 39 at xAK/cAK=100% runs at an angle relative to the local tangent of the mean line 39 at xAKk/cAK measuring 5°-15°, with 10° being especially preferred.

Figure 3:
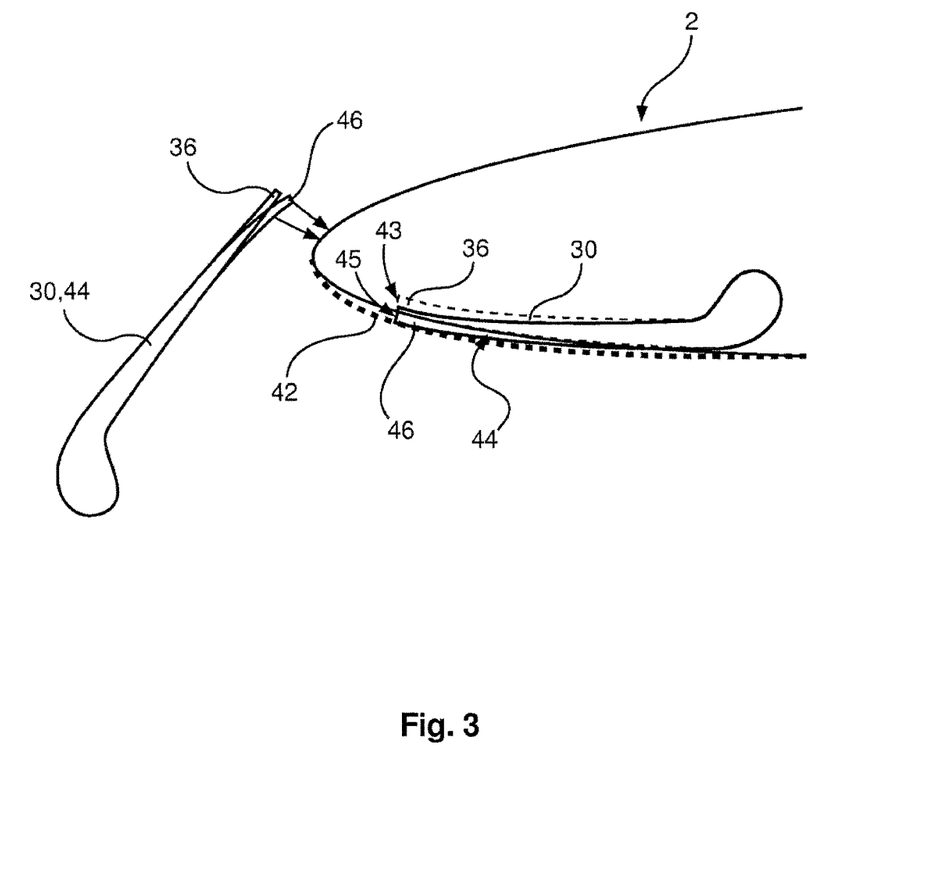
FIG. 3 shows another exemplary embodiment of a high lift system according to the invention.

As depicted in FIG. 3, this effect may be improved even a bit more by giving the profile of the wing 2 a thickened segment 42, without having to shift the lift flaps 30, 32 or 34 too far in the direction of the leading edge 8 of the wing 2. A targeted thickening makes it possible to vary leading depression edges 45 or 43 in terms of position from the profile chord, so that a lift flap 44 can be arranged at a somewhat steeper angle in a depression, which leads to an elevated curvature in the area of a trailing edge 46.

Figure 4:
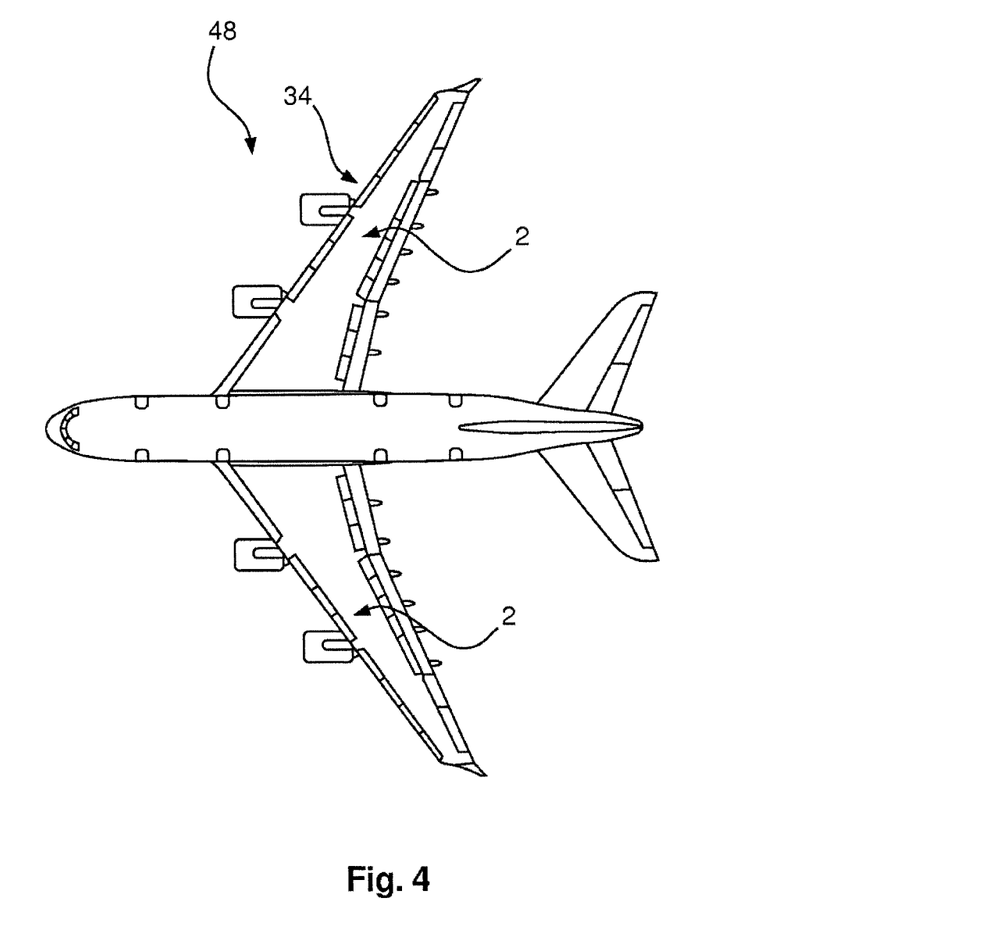
FIG. 4 shows an aircraft with at least one high lift system according to an embodiment of the invention.

Finally, FIG. 4 shows an aircraft 48 with at least one high lift system according to the features described above, which comprises at least one lift flap 34 that is covered on FIG. 4.

In addition, let it be noted that "comprising" does not preclude any other elements or steps, and that "an" or "a" do not rule out a plurality. Let it further be noted that features described with reference to one of the above exemplary embodiments can also be used in combination with other features in other exemplary embodiments described above. Reference numbers in the claims are not to be viewed as a limitation.

REFERENCE NUMBERS

1 Wing
2 High lift system
6 Lift flap
8 Leading edge
10 Gap
12 Profile chord
14 Trailing edge
16 Depression
18 Leading depression edge
20 Trailing depression edge
22 Trailing edge
24 Leading depression edge
26 Leading depression edge
28 Leading depression edge
30 Lift flap
31 Depression
32 Lift flap
33 Depression
34 Lift flap
35 Depression
36 Trailing edge
38 Trailing edge
39 Mean line
40 Trailing edge
41 Tangent
42 Thickened segment
43 Leading depression edge
44 Lift flap
45 Leading depression edge
46 Trailing edge
48 Aircraft
x/c Relative position on a wing
$x_{AK}/c_{AK}$ Relative position on a lift flap

The invention claimed is:

1. A high lift system for an aircraft, the system comprising:
   at least one lift flap arranged on a wing to form a gap between a leading edge of the wing and a trailing edge of the lift flap in an entirely extended position of the lift flap;
   at least one flap adjustment mechanism for moving the lift flap between a retracted and at least one extended position relative to the wing,
   wherein the wing comprises a depression with a leading depression edge for accommodating the lift flap in a retracted position,
   wherein the leading depression edge is arranged in such an area of the wing that a correspondingly formed region near the trailing edge of the lift flap comprises a curvature, by which the gap between the leading edge of the wing and trailing edge of the lift flap is convergent, and
   wherein the leading depression edge is arranged in a position corresponding to a ratio of 0.5 to 2% of the profile depth of the wing as viewed from the leading edge.

2. The high lift system of claim 1,
   wherein the depression on the wing is configured in such a way that a first local tangent of a mean line for the lift flap is inclined at an angle of 5-30° at a trailing edge thereof relative to a profile chord of the lift flap.

3. The high lift system of claim 1,
   wherein the wing comprises a thickened segment at least in the area of the leading depression edge.

4. A high lift system for an aircraft, the system comprising:
   at least one lift flap arranged on a wing to form a gap between a leading edge of the wing and a trailing edge of the lift flap in an entirely extended position of the lift flap;
   at least one flap adjustment mechanism for moving the lift flap between a retracted and at least one extended position relative to the wing,
   wherein the wing comprises a depression with a leading depression edge for accommodating the lift flap in a retracted position,
   wherein the leading depression edge is arranged in such an area of the wing that a correspondingly formed region near the trailing edge of the lift flap comprises a curvature, by which the gap between the leading edge of the wing and trailing edge of the lift flap is convergent, and wherein the depression on the wing is configured in such a way that a first local tangent of a mean line for the lift flap is inclined at an angle of 5-30° at a trailing edge thereof relative to a profile chord of the lift flap, and
   wherein the depression on the wing is configured in such a way that, in an area of the correspondingly formed lift flap lying in a ratio of 5 to 25% of the profile depth of the lift flap, a second tangent to the mean line includes an angle with the first tangent of the mean line that measures 5-20°.

5. An aircraft, comprising:
   first and second wings,
   first and second lift flaps arranged on the first and second wings, respectively, to form a gap between a leading edge of the wings and a trailing edge of the lift flaps in an entirely extended position of the lift flaps;
   at least first and second flap adjustment mechanisms for moving the first and second lift flaps, respectively, between a retracted and at least one extended position relative to the first and second wings, respectively;
   wherein each of the first and second wings comprises a depression with a respective leading depression edge for accommodating the corresponding lift flaps in a retracted position,
   wherein the leading depression edge is arranged in such an area of the respective wing that a correspondingly formed region near the trailing edge of the lift flap stowable therein comprises a curvature, by which the gap between the leading edge of the wing and the trailing edge of the lift flap is convergent, and wherein the leading depression edge is arranged in a position corresponding to a ratio of 0.5 to 2% of the profile depth of the wing as viewed from the leading edge.

\* \* \* \* \*